(12) United States Patent
Arana et al.

(10) Patent No.: US 10,627,909 B2
(45) Date of Patent: Apr. 21, 2020

(54) SIMULATION EXPERIENCE WITH PHYSICAL OBJECTS

(71) Applicant: Disney Enterprises, Inc., Burbank, CA (US)

(72) Inventors: Mark Arana, Agoura Hills, CA (US); Benjamin F. Havey, Burbank, CA (US); Edward Drake, Agoura Hills, CA (US); Alexander C. Chen, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 8 days.

(21) Appl. No.: 15/403,075

(22) Filed: Jan. 10, 2017

(65) Prior Publication Data

US 2018/0196523 A1    Jul. 12, 2018

(51) Int. Cl.
| | |
|---|---|
| G06F 3/01 | (2006.01) |
| A63F 13/65 | (2014.01) |
| A63F 13/5255 | (2014.01) |
| A63F 13/25 | (2014.01) |
| A63F 13/212 | (2014.01) |
| A63F 13/213 | (2014.01) |
| A63F 13/211 | (2014.01) |
| A63F 13/80 | (2014.01) |
| A63F 13/833 | (2014.01) |
| A63F 13/812 | (2014.01) |
| A63F 13/21 | (2014.01) |

(52) U.S. Cl.
CPC ............ G06F 3/017 (2013.01); A63F 13/211 (2014.09); A63F 13/212 (2014.09); A63F 13/213 (2014.09); A63F 13/25 (2014.09); A63F 13/5255 (2014.09); A63F 13/65 (2014.09); A63F 13/80 (2014.09); G06F 3/011 (2013.01); G06F 3/016 (2013.01); *G06F 2203/013* (2013.01)

(58) Field of Classification Search
USPC .......................................................... 345/156
See application file for complete search history.

(56) References Cited

U.S. PATENT DOCUMENTS

| | | | |
|---|---|---|---|
| 5,913,727 A * | 6/1999 | Ahdoot .................. | A63F 13/06 463/39 |
| 6,053,815 A | 4/2000 | Hara et al. ..................... | 403/46 |
| 6,408,257 B1 * | 6/2002 | Harrington ............ | G06T 11/00 348/14.16 |
| 6,691,032 B1 | 2/2004 | Irish et al. .................... | 701/213 |
| 8,758,126 B2 | 6/2014 | Bavitz et al. .................. | 463/23 |
| 8,988,465 B2 | 3/2015 | Baron et al. .................. | 345/633 |
| 9,266,018 B2 | 2/2016 | Story, Jr. et al. .............. | 463/23 |

(Continued)

OTHER PUBLICATIONS

U.S. Appl. No. 14/966,754, filed Dec. 11, 2015, Disney Enterprises, Inc.

*Primary Examiner* — Chineyere D Wills-Burns
(74) *Attorney, Agent, or Firm* — Dorsey & Whitney LLP

(57) ABSTRACT

A simulation adapter can be attached to a real-world physical object and adapted to communicate one or more characteristics and/or simulation events associated with the real-world physical object to a simulation device. The simulation device is adapted to generate a simulation experience based upon the one or more characteristics of the real-world physical object and/or the simulation events associated with the real-world physical object.

19 Claims, 8 Drawing Sheets

OBTAIN A CHARACTERISTICS PROFILE COMPRISING ONE OR MORE CHARACTERISTICS INDICATIVE OF A PHYSICAL OBJECT
100

↓

TRANSMIT THE CHARACTERISTICS PROFILE TO A SIMULATION DEVICE
102

↓

INTERACT WITH THE SIMULATION DEVICE SUCH THAT SIMULATION EVENTS EXPERIENCED BY OR INITIATED BY THE PHYSICAL OBJECT TO WHICH A SIMULATION ADAPTER IS ATTACHED ARE REPRESENTED, COMMENSURATE WITH THE ONE OR MORE CHARACTERISTICS, IN A SIMULATION EXPERIENCE GENERATED BY THE SIMULATION DEVICE
104

RECEIVE A CHARACTERISTICS PROFILE COMPRISING ONE OR MORE CHARACTERISTICS INDICATIVE OF A PHYSICAL OBJECT
110

↓

MATCH THE CHARACTERISTICS PROFILE OF THE PHYSICAL OBJECT WITH A CORRESPONDING PERFORMANCE PROFILE
112

↓

GENERATE A SIMULATION EXPERIENCE BASED UPON AT LEAST ONE OF THE ONE OR MORE CHARACTERISTICS, WHEREIN SIMULATION EVENTS INVOLVING USE OF THE PHYSICAL OBJECT ARE REPRESENTED BASED UPON THE PERFORMANCE PROFILE
114

(56) References Cited

U.S. PATENT DOCUMENTS

| | | |
|---|---|---|
| 9,293,042 B1 | 3/2016 | Wasserman ............... 340/905 |
| 9,327,189 B2 | 5/2016 | Bavitz et al. ................ 463/30 |
| 9,610,510 B2 | 4/2017 | Comploi ...................... 701/23 |
| 10,078,917 B1* | 9/2018 | Gaeta ................. G06T 15/503 |
| 2004/0063481 A1* | 4/2004 | Wang ................... A63F 13/02 |
| | | 463/8 |
| 2006/0148563 A1* | 7/2006 | Yang .................... A63F 13/02 |
| | | 463/36 |
| 2006/0252541 A1* | 11/2006 | Zalewski ............. A63F 13/02 |
| | | 463/36 |
| 2008/0055248 A1* | 3/2008 | Tremblay ............... G06F 3/011 |
| | | 345/158 |
| 2008/0311983 A1 | 12/2008 | Koempel et al. ............ 700/213 |
| 2009/0079705 A1 | 3/2009 | Sizelove et al. ............. 345/173 |
| 2010/0033427 A1* | 2/2010 | Marks ................... H04N 13/10 |
| | | 345/156 |
| 2010/0048273 A1* | 2/2010 | Wallace ................. G09B 9/00 |
| | | 463/7 |
| 2012/0089275 A1 | 4/2012 | Yao-Chang et al. ............. 701/2 |
| 2012/0264518 A1 | 10/2012 | Rouille .......................... 463/39 |
| 2012/0268360 A1* | 10/2012 | Mikhailov ............. G06F 3/017 |
| | | 345/156 |
| 2013/0083061 A1 | 4/2013 | Mishra et al. ............... 345/633 |
| 2013/0166147 A1 | 6/2013 | Chudzinski et al. .......... 701/36 |
| 2013/0212501 A1* | 8/2013 | Anderson ............. G06F 3/0484 |
| | | 715/764 |
| 2013/0286004 A1* | 10/2013 | McCulloch ........... G06T 19/006 |
| | | 345/419 |
| 2014/0128144 A1 | 5/2014 | Bavitz et al. .................. 463/23 |
| 2014/0128145 A1 | 5/2014 | Hwang et al. ................ 463/30 |
| 2014/0245152 A1* | 8/2014 | Carter ................... G11B 27/28 |
| | | 715/720 |
| 2014/0274313 A1* | 9/2014 | Bala ..................... G06Q 30/06 |
| | | 463/25 |
| 2014/0295963 A1 | 10/2014 | Ishikawa et al. ............. 463/31 |
| 2014/0342790 A1 | 11/2014 | Kim et al. ..................... 434/65 |
| 2015/0065237 A1 | 3/2015 | Hohn .............................. 463/29 |
| 2015/0097864 A1 | 4/2015 | Alaniz et al. ................. 345/633 |
| 2015/0202962 A1 | 7/2015 | Habashima et al. ......... 345/633 |
| 2015/0215309 A1* | 7/2015 | Aigner ................ H04L 63/0853 |
| | | 726/4 |
| 2015/0331576 A1* | 11/2015 | Piya ...................... G06F 3/011 |
| | | 715/850 |
| 2016/0117406 A1* | 4/2016 | Agrawal ........... G06F 17/30687 |
| | | 707/749 |
| 2016/0199730 A1 | 7/2016 | Olson et al. .................. 463/31 |
| 2016/0206955 A1 | 7/2016 | Goslin et al. ................. 463/35 |
| 2016/0206957 A1 | 7/2016 | Goslin et al. ................. 463/31 |
| 2016/0299567 A1 | 10/2016 | Crisler et al. ................ 345/156 |
| 2017/0021282 A1 | 1/2017 | Comploi ....................... 701/23 |
| 2017/0045946 A1 | 2/2017 | Smoot et al. ................. 345/156 |
| 2017/0068311 A1 | 3/2017 | Evans et al. ................. 345/156 |
| 2017/0072316 A1 | 3/2017 | Finfter ........................... 463/32 |
| 2017/0092038 A1* | 3/2017 | Vann .................... G07F 17/323 |

* cited by examiner

SIMULATION EXPERIENCE WITH PHYSICAL OBJECTS

TECHNICAL FIELD

The present disclosure relates generally to simulated experiences, such as that experienced in gaming environments and augmented reality (AR)/virtual reality (VR) environments.

DESCRIPTION OF THE RELATED ART

VR can refer to the creation of a fully immersive virtual world/space experience with which users may interact. AR can refer to the blending of VR elements and real life. For example, AR may involve providing a live displayed experience of a physical, real-world environment in which the real-world elements are augmented by computer-generated sensory input. Still other environments, such as that created in a video game, can involve simulating player interaction(s) within the gaming environment.

BRIEF SUMMARY OF THE DISCLOSURE

In accordance with one embodiment, a computer-implemented method comprises obtaining a characteristics profile comprising one or more characteristics indicative of a physical object, and transmitting the characteristics profile to a simulation device. The method further comprises interacting with the simulation device such that simulation events experienced by or initiated by the physical object to which a simulation adapter is attached are represented in a simulation experience generated by the simulation device commensurate with the one or more characteristics.

In accordance with one embodiment, a computer-implemented method comprises receiving at a simulation device, a characteristics profile comprising one or more characteristics indicative of a physical object, and matching the characteristics profile of the physical object with a corresponding performance profile. The method further comprises generating a simulation experience based upon at least one of the one or more characteristics, wherein simulation events involving use of the physical object are represented based upon the performance profile.

In accordance with one embodiment, a system comprises a simulation device adapted to generate a simulation experience based upon one or more characteristics associated with a physical object and one or more simulation event occurrences associated with the physical object. The system further comprises a simulation adapter attached to the physical object and adapted to communicate the one or more characteristics associated with the physical object and the one or more simulation event occurrences associated with the physical object to the simulation device.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
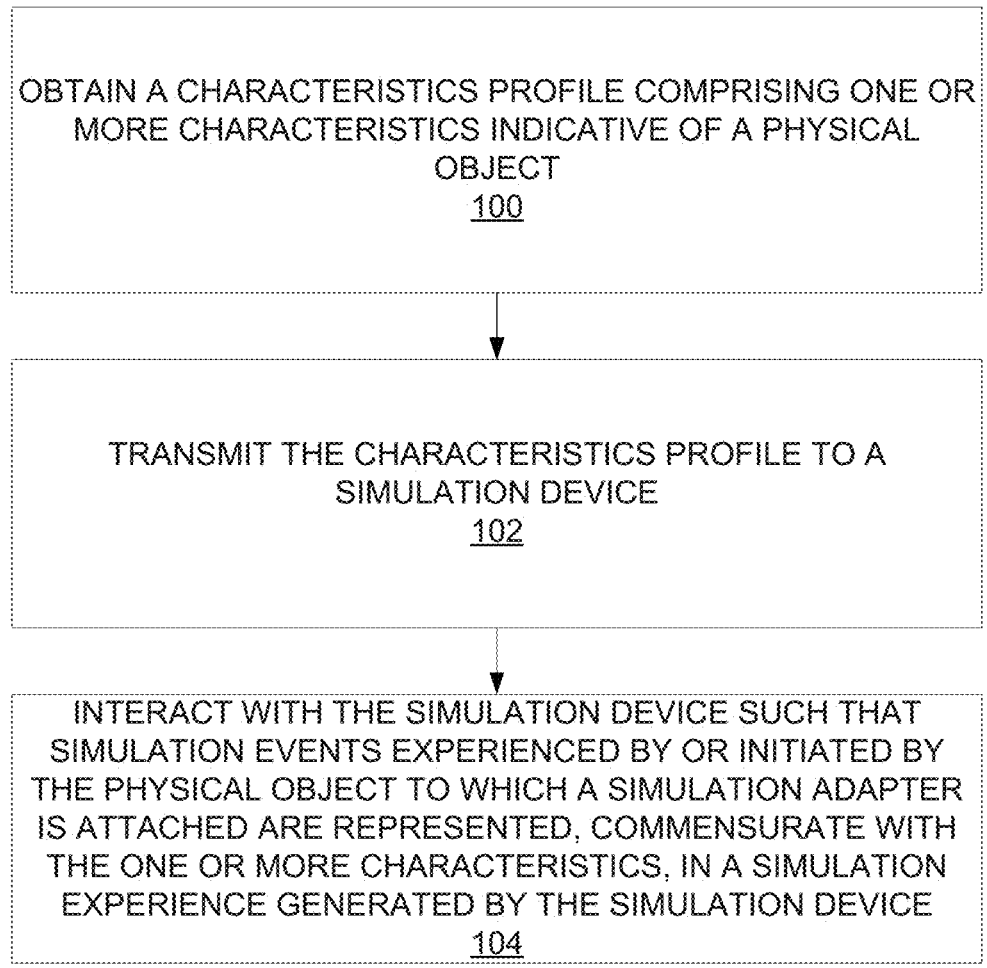
FIG. 1A is an operational flow diagram illustrating an example process for providing a simulation experience with physical objects in accordance with one embodiment.

The figures are not exhaustive and do not limit the present disclosure to the precise form disclosed.

DETAILED DESCRIPTION

Systems that provide or generate simulated environments often rely on dedicated input mechanisms. For example, conventional gaming systems rely on one or more dedicated controllers that allow a user or player to interact with the gaming system, such as control a virtual object within a game. These dedicated controllers generally have the same form factor and functionality, which may comprise a one- or two-handed device that includes one or more directional pads and one or more buttons. Regardless of the type of virtual object being controlled, whether it is virtual athletic equipment, a weapon or some other object, the user's simulated experience is limited because the dedicated controller does not accurately represent the virtual object being used or controlled.

Some systems rely on dedicated "wand" controllers that can be thought of as being somewhat representative of a virtual object, such as a bat or racquet. Some games, such as guitar simulation games, rely on guitar-shaped controllers operated using buttons and simulated "strummer" rather than actual strings. Still other dedicated controllers comprise a simulacrum of an object in which a wand controller can be inserted. Nevertheless, these systems and controllers fall short of an "accurate" experience. That is, a toy-like version of a racquet cannot accurately simulate the weight and swing characteristics of an actual racquet, nor can a toy-like version of a guitar simulate the playing characteristics of a real guitar.

Accordingly, various embodiments of the present disclosure are directed to a simulation adapter 204 (FIG. 2A) that can be attached to a (real-world) physical object 202, where the simulation adapter 204 allows a user to interact with or engage in a simulation experience within a simulation environment using that actual, physical object 202. In some embodiments, the characteristics of the physical object 202 can be relayed to a simulation device or system 206 such that the performance of the physical object 202 in response to simulated events can be accurately represented. In some embodiments, one or more characteristics of the physical object 202 can be customized or enhanced. In some embodiments, the simulation adapter 204 can be configurable such that it can be attached to different types of physical objects and appropriately configured to reflect those different types of physical objects. In still other embodiments, the use of simulation adapter 204 may be bypassed. Accordingly, the simulation device or system 206 may be utilized to directly input and/or receive one or more characteristics profiles associated with the physical object 202.

As used herein, the term physical object can refer to a real-world analog used to interact with or interact in a simulated environment, such as a gaming environment, an AR/VR experience, and the like. It is distinguished from dedicated controllers that are used solely for controlling or interacting within a simulated experience or environment. For example, a user may use a real-world baseball bat (useable in real life) to also play a simulated baseball game generated or presented by a gaming system.

FIG. 1A illustrates an example process performed by a simulation adapter in accordance with various embodiments for providing a simulated experience using a physical object.

At operation 100, a characteristics profile comprising one or more characteristics indicative of a physical object is obtained. This allows a simulation adapter to be used with a desired physical object. There may be more than one characteristics profiles stored in a simulation adapter or the simulation adapter may be able to obtain additional characteristics profiles associated with other types of physical objects. The manner in which characteristics profiles may be obtained, stored, and utilized will be further described below.

Figure 2A:
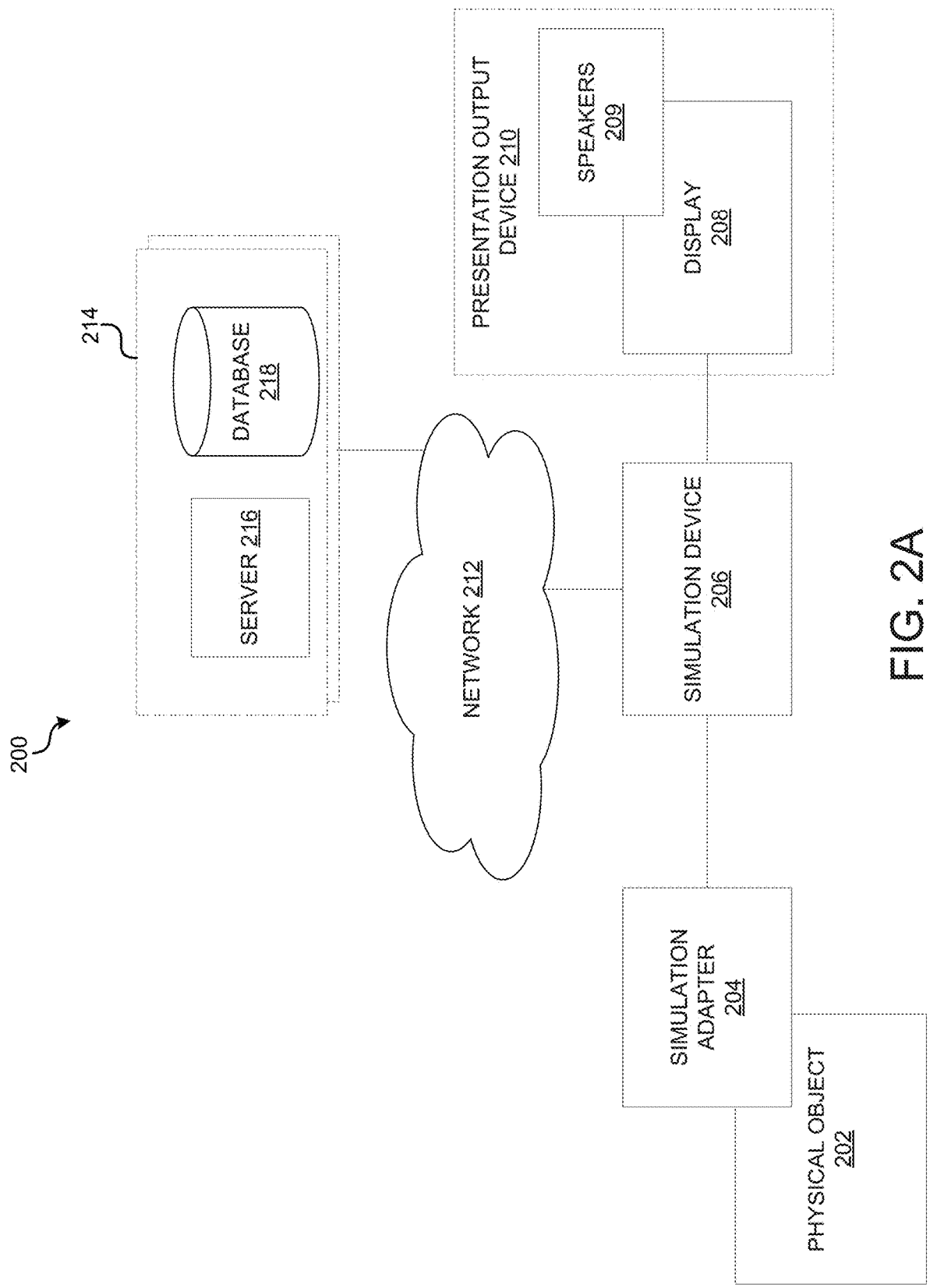
FIG. 2A illustrates an example system for providing a simulation experience using physical objects in accordance with various embodiments.

For example, if the simulation adapter is to be used with a physical object such as a real-world baseball bat, the simulation adapter can be configured to operate in a baseball bat mode. This can be achieved by retrieving baseball bat characteristics profile from local memory. A simulation adapter can locally store one or more characteristics profiles in local memory, and a user need only activate a desired characteristics profile. As illustrated in FIG. 2C, a simulation adapter 204 may have a user interface, such as a display 204F (e.g., touchscreen) and/or one or more buttons 204G to navigate through the display. In some embodiments, simulation adapter 204 may have a microphone 204H that the user may use to interact with simulation adapter 204 via voice commands. In some embodiments, as illustrated in FIG. 2D, the simulation adapter 204 may have a simpler user interface such as a single button 204I which the user may press to activate a particular characteristics profile. When more than one characteristics profile is stored in the simulation adapter, sequential button presses or a particular combination of button presses may activate a particular characteristics profile. In some embodiments, the simulation adapter may be communicatively connected to a personal computing device, such as a PC, a smart phone, a tablet, a dedicated configuration device, a gaming console, a simulation device (discussed in greater detail below), or similar device. A particular characteristics profile can be selected by interacting with the simulation adapter through the personal computing device. It should be noted that simulation adapter 204 may also be configured to perform one or more calibration techniques to adjust or tune certain aspects of simulation adapter 204, such as sensors, to a particular physical object.

Alternatively, characteristics profiles can be obtained from a remote database or server and loading them in the simulation adapter. Referring to FIG. 2A which illustrates an example system in which various embodiments may be implemented, simulation adapter 204 may obtain one or more characteristics profiles from a simulation device 206 and/or one or more service providers 214, such as an online gaming host, a manufacturer or retailer of the physical object 202, or some other data repository or source of characteristics profile information. Service providers 214 may comprise a server 216 and a database 218 from which characteristics profiles can be obtained via network 212. In some embodiments, one or more characteristics profiles may be input, updated, and/or deleted through an communicatively connected computing device, such as a smart phone, PC, tablet, etc. In some embodiments, simulation adapter 204 may store one or more characteristics profile values or identifiers that can be associated with one or more corresponding characteristics profiles stored from the simulation device 206 and/or the one or more service providers 214. In this way, an entire characteristics profile need not be downloaded to simulation adapter 204.

Alternatively still, physical product 202 may have a product identifier, such as a universal product code (UPC), a serial number, a model number, a QR code, or other identifier which a user may scan with a device, such as a smart phone or the simulation adapter 204. The scanning device can obtain a corresponding characteristics profile associated with the physical object 202 from local memory, simulation device 206 and/or the one or more service providers 214. The scanning device may transmit the characteristics profile to simulation adapter 204 using wireless communications via Bluetooth, Wi-Fi, infrared communications, Near Field Communications (NFC), for example, or through a wired connection, such as via Universal Serial Bus (USB).

Network 212 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 212 may employ various communication media, such as a coaxial cable, fiber optic cable system, Ethernet, radio waves, etc. Further still, network 212 may be one or more combinations of any of the aforementioned networks.

At operation 102, the characteristics profile obtained by simulation adapter may be transmitted to a simulation device. Referring again to FIG. 2A, an example of such a simulation device, simulation device 206, may be communicatively connected to simulation adapter 204. Simulation device 206 may be a set top box, a gaming console, or in some embodiments, may be part of a TV, monitor, head-mounted display (HMD) device, or some similar device. Transmission of the characteristics profile can occur wirelessly via Bluetooth, Wi-Fi, infrared communications, NFC, for example, or through a wired connection, such as via USB. In this way, simulation device 206 can be apprised of at least the type of physical object 202 that is to be used for interaction with or in a simulation environment generated by simulation device 206.

At operation 104, simulation adapter 204 and simulation device 206 may interact such that simulation events experienced or initiated by the physical object 202 to which simulation adapter 204 is attached or associated are represented in a simulation experience generated by simulation device 206. The representation is commensurate with the one or more characteristics. For example, the movement of physical object 202 or a user's movement relative to physical object 202 can be relayed to simulation device 206 via simulation adapter 204. In this way, simulation device 206 can accurately represent physical object 202 in the simulation experience.

The simulation experience may be presented on a presentation output device 210. In some embodiments, presentation output device 210 may comprise at least one of a display 208 for presenting visual aspects of the simulation experience, and one or more speakers 209 through which audio aspects of the simulation experience may be presented.

Display 208 may provide a simulation experience through visual information presented thereon. Visual information may include information that may be observed visually, such as an image, video, and/or other visual information. Display 208 may be included in or be embodied as one or more of an HMD 410 (see FIG. 4), an HMD in which simulation device 206 (or alternatively, presentation device 210) may be integrated, a see-through display, an optical see-through display, a video see-through display, a visor, eyeglasses, sunglasses, a computer, a laptop, a smartphone, a tablet, a mobile device, a projector, a monitor, a TV, and/or other displays.

In some implementations, display 208 may include a motion, position, and/or orientation tracking component, so that the visual information presented on display 208 changes as the position and/or orientation of display 208, the user, and/or the physical object 202 changes. Display 208 may be configured to display a simulation experience using AR, VR, or other simulation presentation technology. For example, display 208 may visually provide the simulation experience by displaying an overlay image over one or more of an image, a video, and/or other visual information so that one or more parts of real-world objects appear to be augmented by one or more parts of virtual-world objects. In some implementations, display 208 may use AR or VR technology to display a simulation experience by using systems and methods described in U.S. patent application Ser. No. 14/966,754, entitled "SYSTEMS AND METHODS FOR AUGMENTING AN APPEARANCE OF AN ACTUAL VEHICLE COMPONENT WITH A VIRTUAL VEHICLE COMPONENT," filed Dec. 11, 2015, the foregoing being incorporated herein by reference in its entirety. Other systems and methods of providing a simulation experience are contemplated.

Speaker 209 may provide a simulation experience through audio information generated by speaker 209. Audio information may include information that may be observed audibly. Audio information may include one or more of sound, vibration and/or other audio information associated with a particular object from that object's characteristics profile, such as the sound of a particular tennis racquet, golf club, hockey stick, ball, weapon, baseball bat, etc. Speaker 209 may include one or more of a headphone, an earphone, a headset, an earset, and/or other speakers. In some implementations, speaker 209 may include a speaker associated with display 208.

Figure 1B:
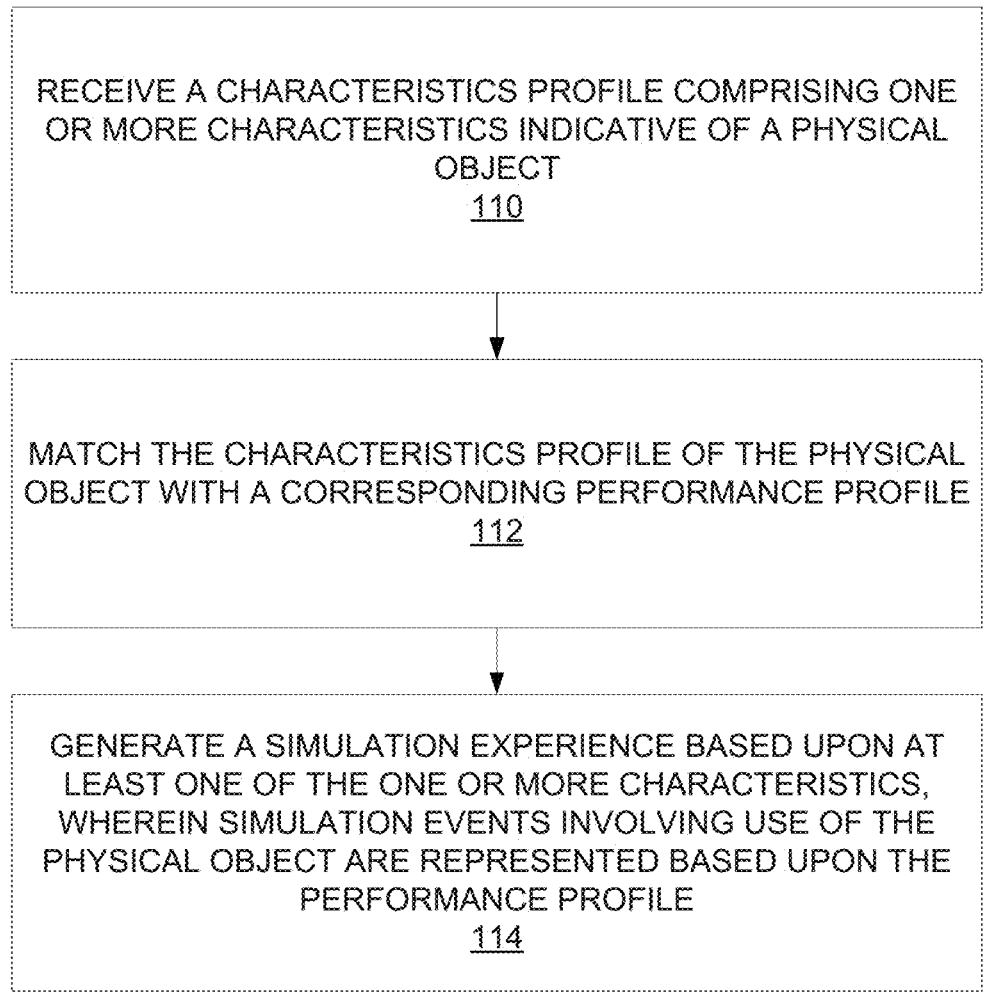
FIG. 1B is an operational flow diagram illustrating an example process for providing a simulation experience with physical objects in accordance with one embodiment.

FIG. 1B illustrates an example process performed by a simulation device, such as simulation device 206 of FIG. 2A, in accordance with various embodiments for providing a simulated experience using a physical object, such as physical object 202. At operation 110, a characteristics profile is received. As described previously, a characteristics profile may comprise one or more characteristics of a physical object. The characteristics profile may be specified or selected by the user through simulation adapter 204, for example, and transmitted by simulation adapter 204 to simulation device 206. In this way, simulation device 206 may be made aware of at least the type of object that physical object 202 embodies, such as a baseball bat or tennis racquet.

At operation 112, the characteristics profile of the physical object may be matched to a corresponding performance profile. For example, and depending on the characteristics specified in its characteristics profile, a corresponding performance profile can be used to determine how simulation device 206 will represent a simulation event or a reaction to a simulation event associated with the use of physical object 202 by the user. That is, a particular type of baseball bat, such a wooden baseball bat having a specified length and weight may behave differently or impart a different result when hitting a ball compared to an aluminum baseball bat having some other specified length and/or weight. In order to present an accurate simulation experience to the user, simulation device 206 can utilize the performance profile that corresponds to the physical object (i.e., at least one or more of the characteristics specified in the characteristics profile) being used in a particular instance. That is, and at operation 114, a simulation experience is generated based upon at least one of the one or more characteristics, wherein simulation events involving use of the physical object are represented based upon the performance profile. The simulation experience can be presented visually, audibly, haptically, and/or in other ways.

Figure 2B:
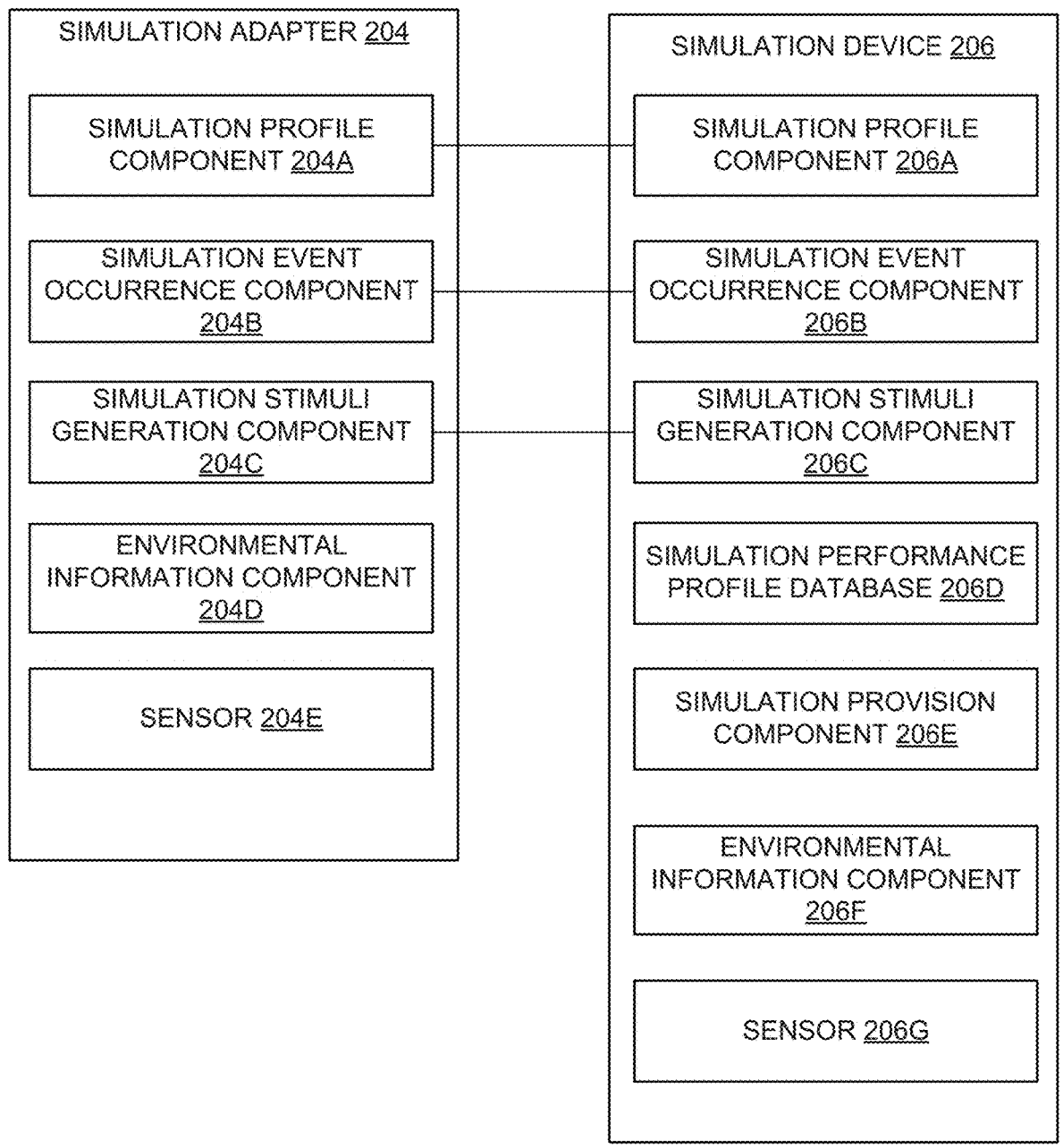
FIG. 2B illustrates example components of the simulation adapter and simulation device elements in the system of FIG. 2A.
Figure 2C:
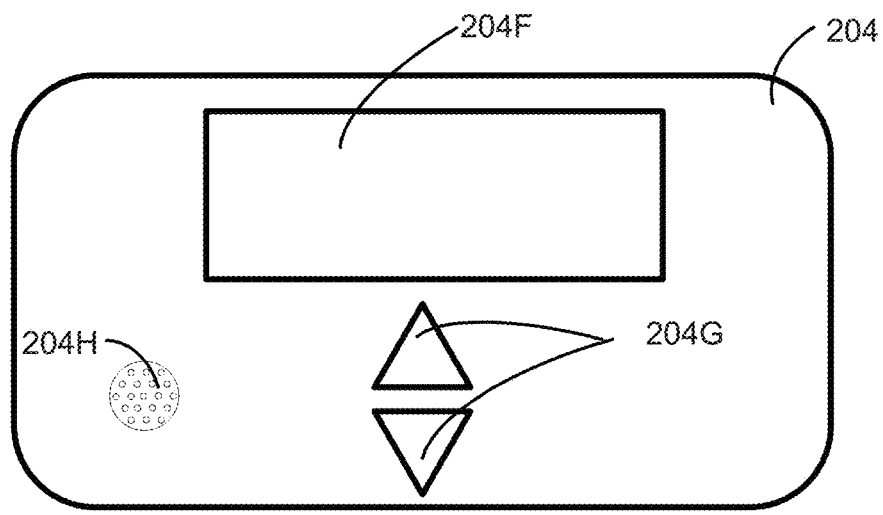
FIG. 2C illustrates an example simulation adapter in accordance with one embodiment.
Figure 2D:
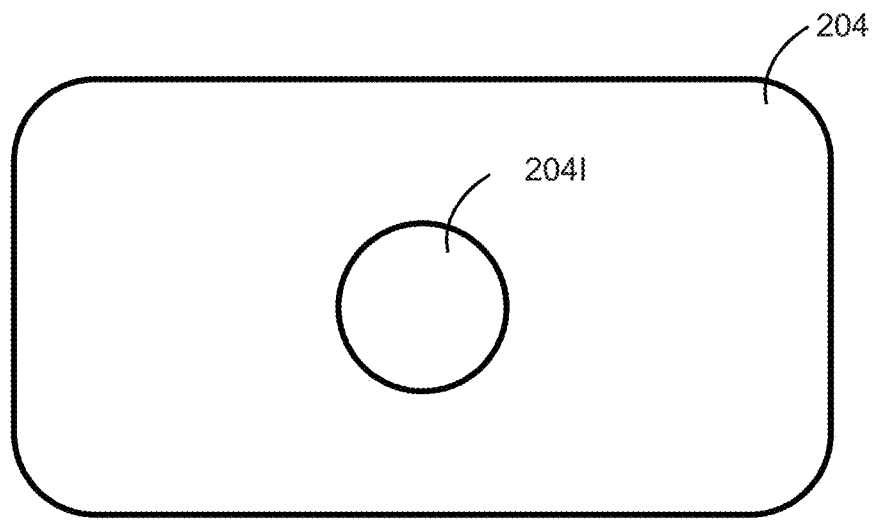
FIG. 2D illustrates an example simulation adapter in accordance with one embodiment.
Figure 5:
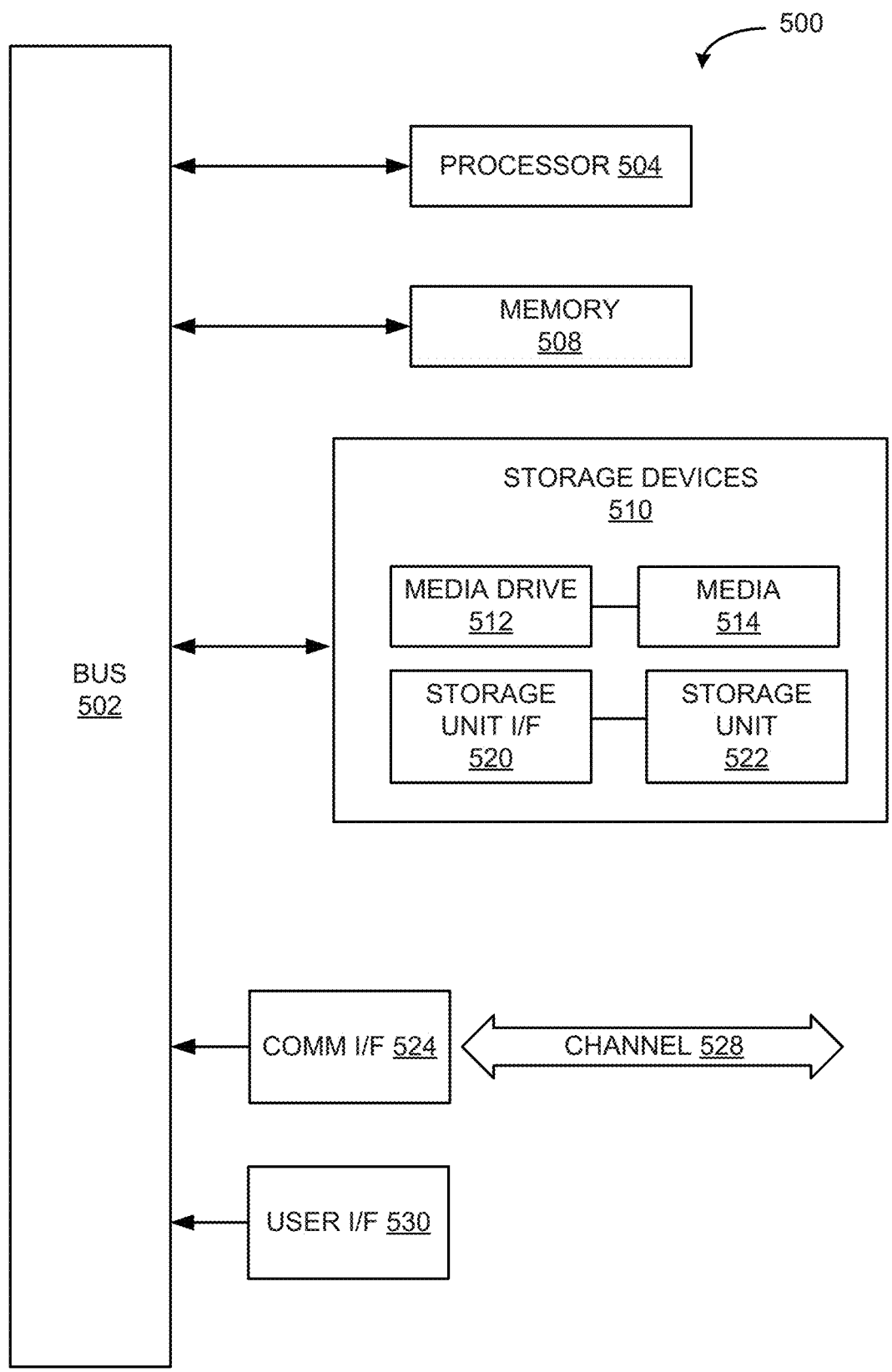
FIG. 5 is an example computing module that may be used to implement various features of embodiments described in the present disclosure.

FIG. 2B illustrates example components that may make up simulation adapter 204 and simulation device 206. Simulation adapter 204 may comprise the following components: a simulation profile component 204A; a simulation event occurrence component 204B; a simulation stimuli generation component 204C; an environmental information component 204D, and at least one sensor 204E. Simulation device 206 may comprise the following components: a simulation profile component 206A; a simulation event occurrence component 206B; a simulation stimuli generation component 206C; a simulation performance profile database 206D; a simulation provision component 206E; an environmental information component 206F; and at least one sensor 206G. It should be noted that not all of the aforementioned components are necessarily needed, and other components, such as local memory, processors, communication components, user interface components, etc. (some of which are depicted in FIGS. 2C, 2D, and 5) may be present.

Regarding simulation adapter 204, simulation profile component 204A may retrieve and hold a particular characteristics profile selected or specified by a user. Simulation profile component 204A may obtain the characteristics profile from a local memory unit, buffer, or cache. Alternatively, upon communicating with simulation device 206 and/or one or more service providers 214, simulation profile component 204A may download or otherwise retrieve a characteristics profile from one or more of these remotely located characteristics profile data stores. Upon establishing a communications channel with simulation device 206, the characteristics profile may be transmitted to simulation device 206. It should be noted the content of a characteristics profile may differ depending on the type of physical object associated with the characteristics profile. Some characteristics profiles may simply include information indicating a type of physical object, whereas some characteristics profiles may additionally include information indicating color, weight, length, height, or any other characteristic that may be relevant in generating a simulation experience. In some embodiments, only information regarding one or more particular characteristics may be sent to simulation device 206 rather than the entire characteristics profile. In some embodiments, a user may alter or otherwise update one or more of the characteristics in a characteristics profile.

Simulation event occurrence component 204B may be configured to identify occurrences of simulation events within the simulation experience. A simulation event may refer to one or more of specific motions, specific actions, specific sounds, specific locations, specific surroundings, and/or other specific conditions relating to the physical object, the user of the physical object, and/or the contextual premise of the simulation experience. Occurrences of simulation events may be identified based on one or more of motion information, activity information, and environment information. Simulation event occurrence component 204B may be configured to identify an occurrence of a simulation event when one or more of motion information, activity information, and/or environment information, indicates an occurrence of one or more of specific motions, specific actions, specific sounds, specific locations, specific surroundings, and/or other specific conditions relating to the physical object and/or the user of the physical object that correspond to a specific simulation event.

Environmental information component 204D may be configured to obtain information regarding the surrounding actions, elements, or other relevant factors or aspects of the surrounding environment that may impact or be affected by the use of the physical object. Simulation event occurrence component 204B may identify occurrences of simulation events based upon information received at environmental information component 204D or transmitted to simulation event occurrence component 204B by environmental information component 204D. Without limitation, environmental information may include motion, action, sound, location, surroundings, and/or other information relating to a physical object and/or a person using the physical object. Environmental information may be obtained from output signals generated by sensor 204E.

Sensor 204E may include one or more of image sensors, audio sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, and/or other sensors. In some embodiments, sensors may further include cameras, a tracking marker, microphone, or any other component that captures environmental information. In some implementations, sensor 204E may be installed in simulation adapter 204. In some implementations, sensor 204E may be worn by a user. In some implementations, sensor 204E may be installed in or otherwise coupled to simulation adapter 204. It should be noted that although only one sensor 204E is illustrated, various embodiments contemplate the use of more than one sensor or some combination of the aforementioned sensors.

Simulation stimulation generation component 204C may be configured to generate simulation stimuli that correspond to simulation events for which occurrences are identified. A simulation stimulus may refer to one or more of a visual, an audio, a haptic and/or other simulation that may change a simulation experience. Simulation stimulation generation component 204C may be configured to generate a simulation stimulus for a simulation event when the simulation stimulus corresponding to the simulation event is found in the simulation information. Simulation stimulation generation component 204C may include one or more stimuli output components (not shown), such as LED lights, one or more speakers, etc. Information for instructing simulation stimulation generation component 204C to generate stimuli may be received from a corresponding simulation stimuli generation component 206C of simulation device 206.

Referring to simulation device 206, the characteristics profile (or information therein) transmitted by simulation profile component 204A may be received by a corresponding simulation profile component 206A. The user may alter or update one or more of the characteristics received by simulation profile component 206A. For example, the user may wish to customize aesthetic aspects to be represented in the simulation environment, such as color of the physical object, different material, branding, adding or subtracting graphics, etc. The user may wish to adjust certain characteristics so that the user can determine how changes to one or more characteristics may affect the real-world performance of the physical object vis-à-vis the simulation environment.

Simulation device 206 may access simulation performance profile database 206D to determine a corresponding performance profile based on the received characteristics profile or one or more information elements indicating one or more characteristics gleaned from the characteristics profile. Alternatively, simulation device 206 may access a third party database or service provider, such as service provider 214 of FIG. 2A, to obtain a relevant performance profile or performance parameters. Performance information contained in or obtained from one or more of the aforementioned data stores may be compiled by the user, a third party, a seller or manufacturer of the physical object. Performance information may also be crowd-sourced, obtained or derived from historical real-world usage of the physical object itself or the same/similar physical objects by other users or entities.

Simulation event occurrence component 206B is configured to receive event occurrence information from the simulation event occurrence component 204B of simulation adapter 204. Similar to simulation event occurrence component 204B, simulation event occurrence component 206B may also be configured to identify occurrences of simulation events based on use of a physical object, but from the perspective of simulation device 206 and/or environmental information component 206G.

Environmental information component 206F, like environmental information component 204D of simulation adapter 204 may be configured to obtain information regarding the surrounding actions, elements, or other relevant factors or aspects of the surrounding environment that may impact or be affected by the use of the physical object. However, such environmental information is obtained at or from the perspective of simulation device 206. In some embodiments, use of simulation adapter 204 is bypassed, and a configuration profile is directly input to or received at simulation device 206. In such embodiments, environmental information component 206F may be used to obtain all relevant information regarding the surrounding actions, elements, or other relevant factors or aspects of the surrounding environment that may impact or be affected by the use of the physical object rather than in addition to that sensed or obtained via simulation adapter 204.

Sensor 206G, like sensor 204E of simulation adapter 204 may include one or more of image sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, and/or other sensors. In some embodiments, sensors may further include cameras or any other component that captures environmental information. In some implementations, sensor 206G may be installed in simulation device 206. In some implementations, sensor 206G may be worn by the user or may be installed in or otherwise coupled to simulation device 206. It should be noted that although only one sensor 206G is illustrated, various embodiments contemplate the use of more than one sensor or some combination of the aforementioned sensors.

Simulation events obtained from simulation event occurrence component 204B, as well as simulation events determined by simulation event occurrence component 206B may be communicated to simulation provision component 206E. Simulation provision component 206E may be configured to provide a simulated experience by operating simulation device presentation output device 220. The simulation experience can be achieved through one or more of visual, audio, haptic and/or other simulation, where the visual, audio, haptic, and/or other simulation changes responsive to simulation event occurrences and simulation stimuli. The simulation event occurrences and/or simulation stimuli may be based on the characteristics and performance associated with physical object 202.

Simulation stimulation generation component 206C of simulation device 206 may be configured to generate simulation stimuli that correspond to simulation events for which occurrences are identified. Simulation stimuli generation component 206C may also transmit instructions to simulation stimuli generation component 204C of simulation adapter 204 that direct simulation stimuli generation component 204C to generate simulation stimuli local to the user and physical object 202.

Figure 3:
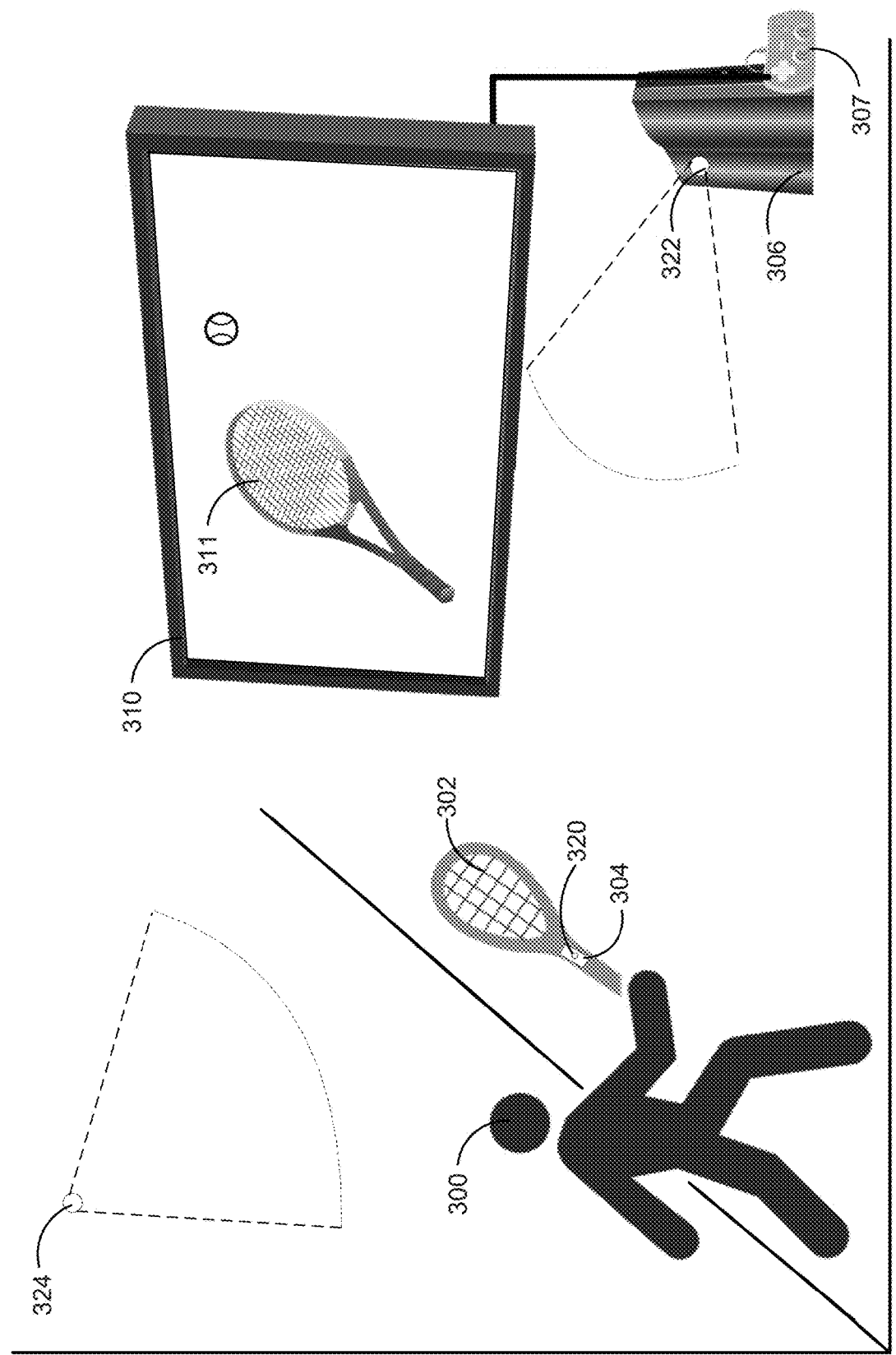
FIG. 3 illustrates an example simulation experience in accordance with one embodiment.

FIG. 3 illustrates an example simulation experience with a physical object provided to a user in accordance with various embodiments. A user 300 may wish to engage in a simulation experience, such as through a computer game or AR/VR experience utilizing physical object 302, i.e., a real-world racquet. The simulation experience may be provided by a gaming console 306 in which a simulation device may be embodied. Physical object 302 is distinguished from a conventional paddle controller 307 usually associated with gaming console 306 for interacting in the simulation experience.

To utilize physical object 302, user 300 may attach a simulation adapter 304 to physical object 302. The manner in which simulation adapter 304 is attached to physical object 302 can vary. In some embodiments, simulation adapter 304 is provided with a reusable adhesive allowing user 300 to attach simulation adapter 304 to physical object 302. In some embodiments, simulation adapter 304 may be configured with one or more attachment mechanisms, such as a Velcro or buckled strap, a clamp, a magnet, a suction cup, or other attachment mechanism.

In this embodiment, simulation adapter 304 may include a tracking marker 320 which can be sensed visually, through one or more electronic transmissions, etc. FIG. 3 illustrates two tracking sensors 322 and 324. In this embodiment, tracking sensor 322 may be implemented at simulation device 306, while tracking sensor 324 may be implemented anywhere a user wishes to locate a sensor, such as on a room wall. It should be noted that more or less tracking sensors may be utilized in accordance with various embodiments. Although not necessary in all embodiments, the use of a tracking marker and tracking sensor(s) can increase the precision of a simulation experience by increasing the amount of data indicative of the movement and/or positioning of physical object 302.

User 300 may select a characteristics profile for physical object 302 through a user interface on simulation adapter 304, by communicatively connecting simulation adapter 304 to a computing device or smart phone, etc. Selection of the characteristics profile can occur at any time and need not only occur upon attachment of simulation adapter 304 to physical object 302. As described above, user 300 may wish to calibrate simulation adapter 304.

A simulation experience may be initiated via gaming console 306. As illustrated, user 300 may now utilize physical object 302 to participate, interact, control, or otherwise engage in the simulation experience, which may be presented on a presentation output device 310, i.e., a TV. Depending on the characteristics profile selected by user 300 and/or any alterations to one or more characteristics contained within the characteristics profile, the simulation device embodied as or within gaming console 306 can generate an accurate representation and experience for user 300. The simulation device may obtain a performance profile commensurate with the characteristics profile, exchange simulation event occurrence information with simulation adapter 304, provide and/or instruct simulation adapter 304 to generate simulation stimuli, etc. In this way, user 300 can engage in a more accurate simulation experience than can be provided by conventional controller 307.

Figure 4:
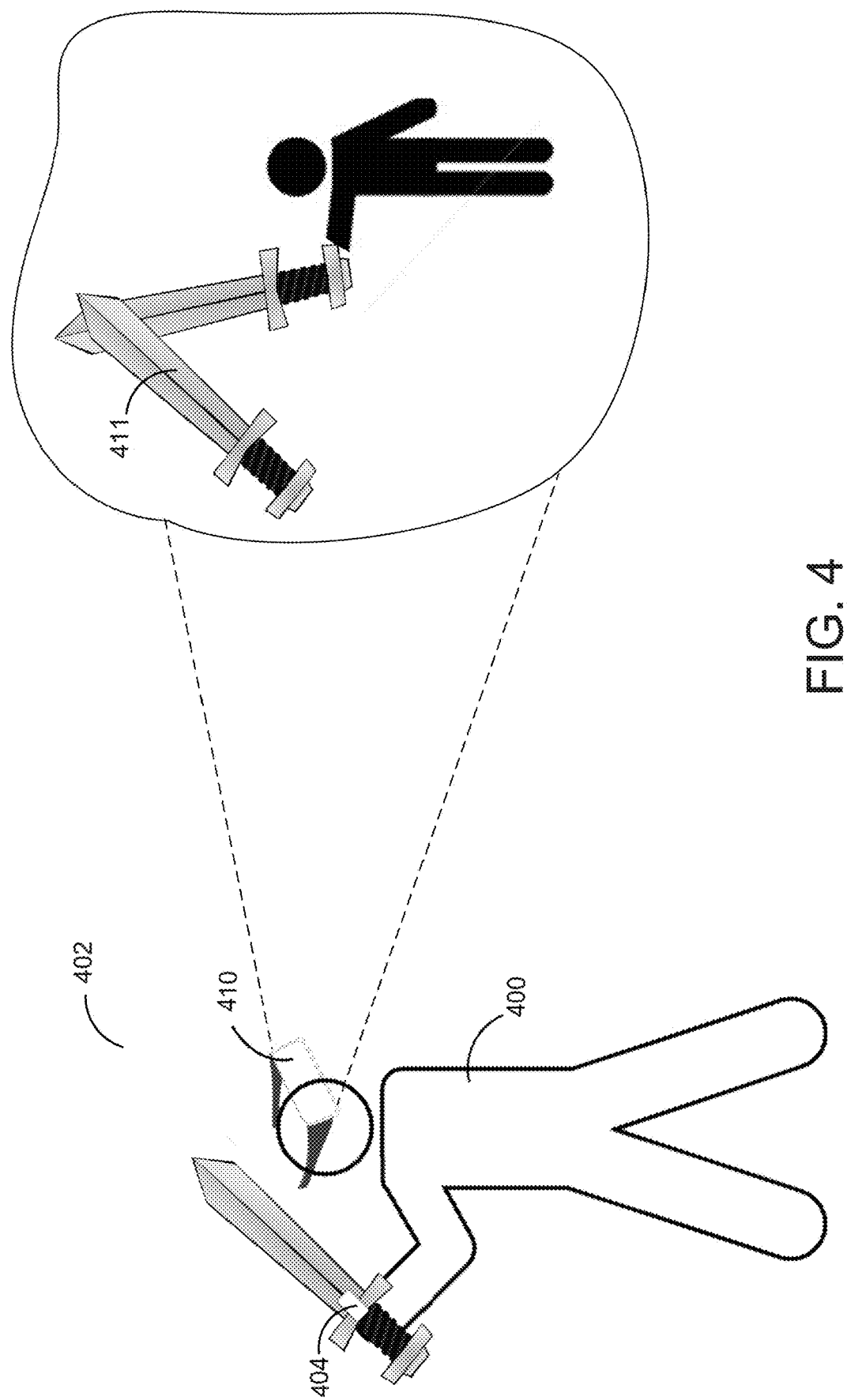
FIG. 4 illustrates an example simulation experience in accordance with one embodiment.

FIG. 4 illustrates an example simulation experience with a physical object provided to a user in accordance with various embodiments. A user 400 may wish to engage in a simulation experience, such as through a computer game or AR/VR experience utilizing physical object 402, i.e., a real-world sword toy built at an amusement park, that the user has brought home. The simulation experience may be provided by an HMD 410 in which a simulation device and presentation output device may be embodied.

To utilize physical object 402, user 400 may attach a simulation adapter 404 to physical object 402. User 400 may select a characteristics profile for physical object 402 through a user interface on simulation adapter 404, by communicatively connecting simulation adapter 404 to a computing device or smart phone, etc. In this embodiment, the characteristics profile for physical object 402 may be obtained by establishing a connection to the amusement park server/database which may be an embodiment of server 216/database 218 (see FIG. 2A). The characteristics profile may have been created upon user 400 building physical object 402 and stored in the amusement park server/database. User 400 may have been given a universal resource locator (URL) from which the characteristics profile can be obtained by simulation adapter 404. Alternatively, simulation adapter 404 may have been configured with the characteristics profile at the amusement park.

A simulation experience may be initiated via HMD 410. As illustrated, user 400 may now utilize physical object 402 (represented as a virtual sword 411) to participate, interact, control, or otherwise engage in the simulation experience, which may be presented through HMD 410. Depending on the characteristics profile selected by user 400, the simulation device embodied as or within HMD 410 can generate an accurate representation and experience for user 400. The simulation device 404 may obtain a performance profile commensurate with the characteristics profile, exchange simulation event occurrence information to generate simulation stimuli (such as sword sound effects), etc.

It should be noted that user 400 may elect to change one or more characteristics associated with physical object 402, such as the color or style. User 400 can change such characteristics via a user interface integrated into simulation adapter 404 or via a connected computing device user interface, such as a smart phone application.

It should be further noted that in the context of the simulation experience presented to user 400, user 400 may be given the opportunity to "unlock" and play with other versions of the virtual object, e.g., a virtual sword having different characteristics, such as more power in the simulation experience, a different color in the simulation experience, etc. Unlocking these other versions may be predicated upon user 400 paying an upgrade fee within the simulation experience, which may be an online gaming experience. Further still, user 400 may be given an opportunity to purchase an upgraded or modified version of the physical object itself. Accordingly, HMD 410 may be configured with functionality to present a transaction interface and/or connectivity to a service provider so that the user 400 can engage in a transaction to purchase the upgraded or modified version of the physical object.

The functionality described in the present disclosure can also be utilized in the context of testing physical objects and/or the sale of customizable products. For example, a simulation adapter may be used to allow a user to demo a "base-level" automobile using an HMD. A user sitting in the base-level automobile may get a simulation experience of being in the automobile and/or driving the automobile per a base-level characteristics profile of the automobile. The user may then change one or more characteristics and virtually experience the updated automobile.

FIG. 5 illustrates an example computing module that may be used to implement various features of the system and methods disclosed herein, for example, one or more elements of system 200, such as simulation adapter 204 and simulation device 206.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example—computing module 500. After reading this description, it will become apparent to a person skilled in the relevant art how to implement the application using other computing modules or architectures.

Referring now to FIG. 5, computing module 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example navigation systems, portable computing devices, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

Further still, computing module 500 may include a user interface 530. User interface 530 may comprise a display, a physical input mechanism such as one or more buttons, softkeys, or other actuatable components, or a combination thereof.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
obtaining a characteristics profile comprising one or more visual and physical characteristics indicative of a non-human physical object, wherein a simulation adapter is attached to the non-human physical object;
transmitting the characteristics profile to a simulation device;
generating a representation of the non-human physical object in a simulation experience generated by the simulation device commensurate with the one or more visual and physical characteristics; and
reflecting, in the simulation experience, real-world simulation events involving the non-human physical object using the representation of the non-human physical object; wherein:
the simulation device is configured to generate the simulation experience based upon environmental conditions impacted by use of the non-human physical object.

2. The computer-implemented method of claim 1, further comprising at least one of:
retrieving the characteristics profile from one or more of a local memory of the simulation adapter, a memory unit of the simulation device, or a memory unit of the remotely located service provider; or
associating a characteristics profile value stored within one or more of the local memory of the simulation adapter with the characteristics profile stored in the memory unit of the simulation device or the memory unit of the remotely located service provider.

3. The computer-implemented method of claim 1, wherein the simulation experience comprises at least one of an augmented reality (AR), a virtual reality (VR), a product testing, or a gaming experience.

4. The computer-implemented method of claim 1, further comprising receiving stimuli generation information instructing the simulation adapter to generate stimuli in response to the simulation events.

5. The computer-implemented method of claim 4, wherein the stimuli comprises at least one of audio, visual, or haptic feedback stimuli.

6. The computer-implemented method of claim 1, further comprising calibrating the simulation adapter to the physical object.

7. The computer-implemented method of claim 1, wherein the characteristics profile is a first characteristics profile and the non-human physical object is a first non-human physical object, the computer-implemented method further comprising:
   obtaining a second characteristics profile comprising one or more visual and physical characteristics indicative of a second non-human physical object;
   transmitting the second characteristics profile to the simulation device;
   generating at least one of:
   a representation of the second non-human physical object in the simulation experience generated by the simulation device; or
   a second simulation experience generated by the simulation device commensurate with the one or more visual and physical characteristics of the second characteristics profile; and
   reflecting real-world simulation events involving the second non-human physical object in the simulation experience generated by the simulation device or the second simulation experience generated by the simulation device.

8. The computer-implemented method of claim 1, further comprising:
   obtaining the environmental conditions from one or more sensors associated with the simulation adapter; and
   transmitting the environmental conditions to the simulation device.

9. The computer-implemented method of claim 8, wherein the one or more sensors comprise one or more of image sensors, audio sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, or a combination thereof.

10. A computer-implemented method, comprising:
    receiving at a simulation device, a characteristics profile comprising one or more visual and physical characteristics indicative of a non-human physical object;
    matching the characteristics profile of the non-human physical object with a performance profile corresponding to the characteristics profile;
    generating a representation of the non-human physical object in a simulation experience based upon at least one of the one or more visual and physical characteristics, wherein simulation events related to real-world use of the non-human physical object are reflected in the simulation experience based upon the performance profile; and
    obtaining the performance profile from a local memory unit of the simulation device and a memory unit of a service provider, wherein the characteristics profile is received from at least one of a simulation adapter attached to the non-human physical object that is configured to communicate simulation event occurrence information to the simulation device or a remote data source accessible by the simulation adapter, wherein
    the simulation device is configured to generate the simulation experience based upon environmental conditions impacted by use of the non-human physical object.

11. The computer-implemented method of claim 10, further comprising receiving the simulation event occurrence information from one or more sensors associated with the simulation device.

12. The computer-implemented method of claim 10, further comprising receiving changes to the one or more visual and physical characteristics related to the non-human physical object and updating the simulation experience based upon at least one of the one or more changes to the one or more visual and physical characteristics.

13. The computer-implemented method of claim 10, further comprising presenting at least one of an option to purchase an updated virtual representation of the non-human physical object or an option to purchase a real-world analog commensurate with the virtual representation of the non-human physical object.

14. The computer-implemented method of claim 10, further comprising:
    analyzing simulation event occurrence information associated with the non-human physical object; and
    at least one of generating simulation stimuli or generating instructions regarding simulation stimuli for transmission to and execution by the simulation adapter attached to the non-human physical object.

15. The computer-implemented method of claim 10, wherein the one or more sensors comprise one or more of image sensors, audio sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, or a combination thereof.

16. A system, comprising:
    a simulation device configured to generate a simulation experience including a representation of one or more visual and physical characteristics associated with a non-human physical object and one or more simulation event occurrences in the real-world associated with the non-human physical object;
    a simulation adapter attached to the non-human physical object and configured to communicate the one or more visual and physical characteristics associated with the non-human physical object and the one or more simulation event occurrences in the real-world associated with the non-human physical object to the simulation device; and
    one or more local and remote data repositories in communication with at least one of the simulation device or the simulation adapter, the one or more local and remote depositories storing the one or more visual and physical characteristics of the non-human physical object and a performance profile representative of one or more responsive actions based upon the one or more visual and physical characteristics of the non-human physical object,
    wherein the simulation device is configured to generate the simulation experience based upon environmental conditions relative to the non-human physical object that impact or are affected by use of the non-human physical object.

17. The system of claim 16, wherein the simulation adapter comprises a simulation stimuli generation component configured to at least one of:
  generate stimuli in response to the one or more simulation event occurrences; or
  receive instructions from the simulation device to generate stimuli in response to the one or more simulation event occurrences.

18. The system of claim 16, wherein at least one of the simulation adapter and the simulation device comprise one or more sensors configured to sense actions of or relative to the non-human physical object and the environmental conditions relative to the non-human physical object.

19. The system of claim 18, wherein the one or more sensors comprise one or more of image sensors, audio sensors, temperature sensors, vehicle speed sensors, wheel speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control module sensors, or a combination thereof.

* * * * *